Patented Feb. 20, 1923.

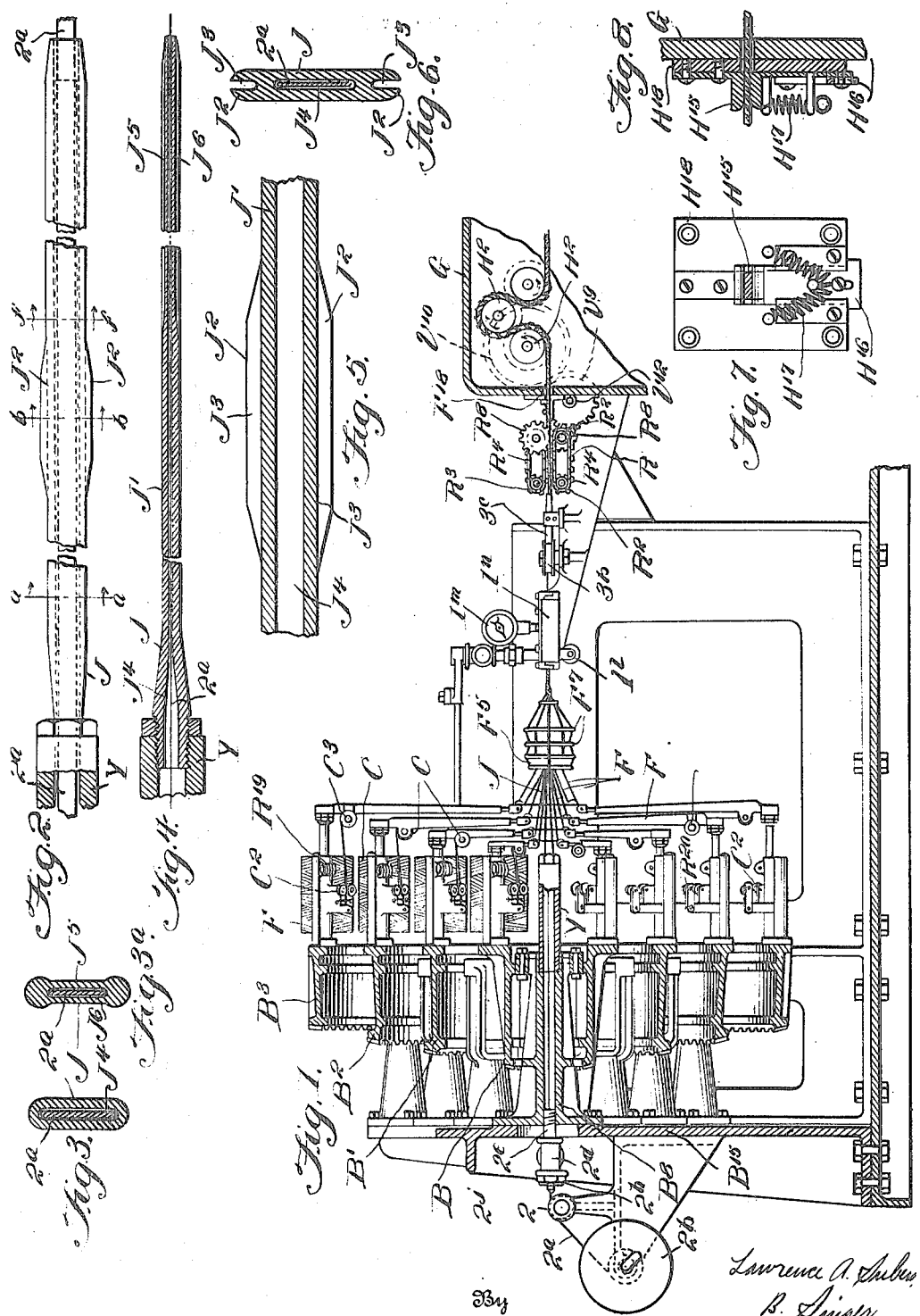

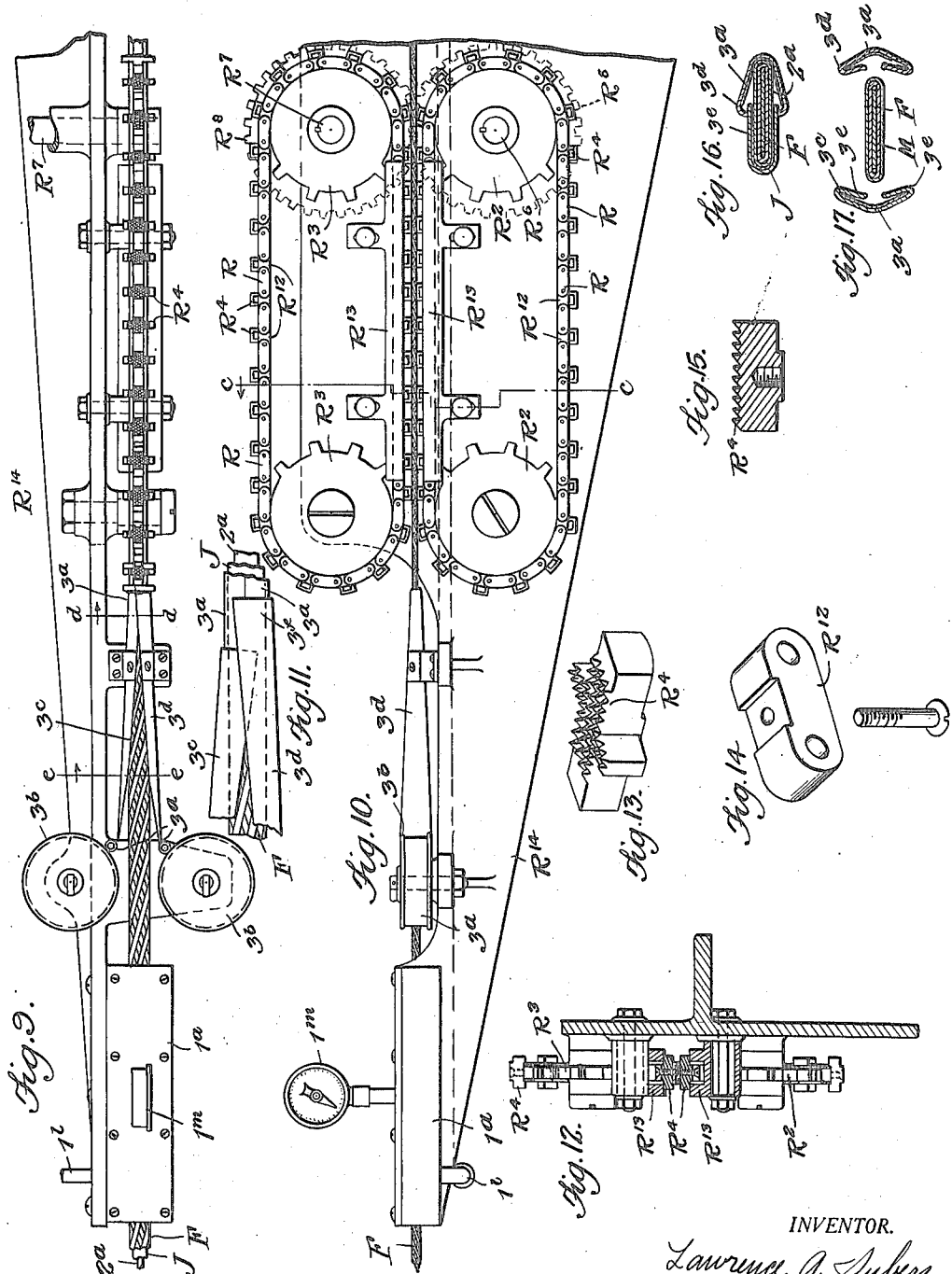

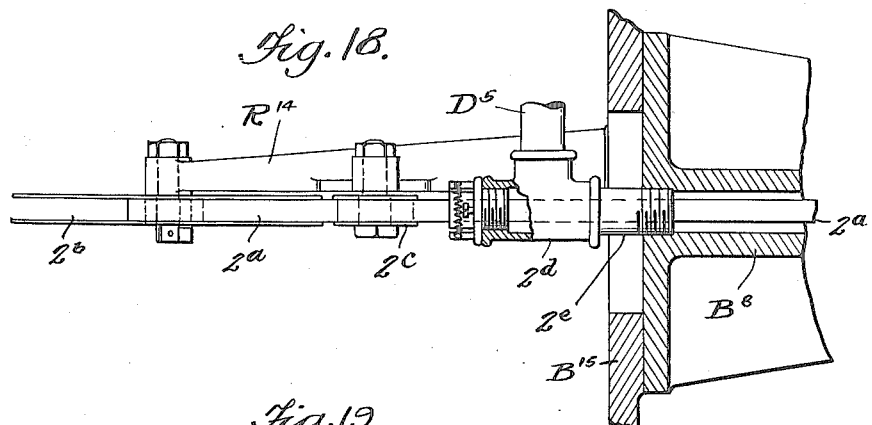
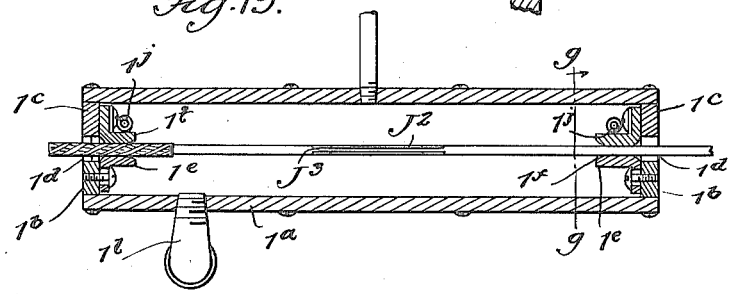
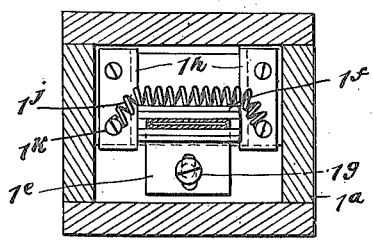
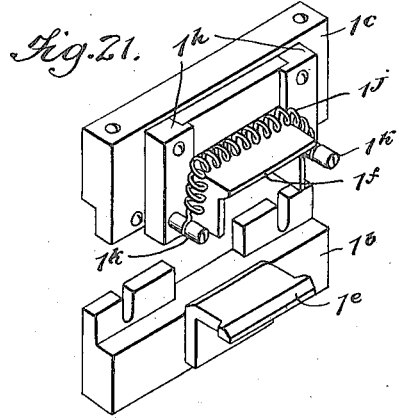
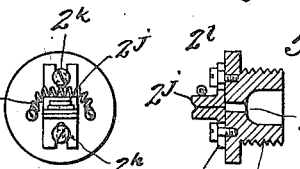

1,445,651

UNITED STATES PATENT OFFICE.

LAWRENCE ALONZO SUBERS, OF LAKEWOOD, OHIO.

AUTOMATICALLY-ACTING COATING DEVICE IN THE MANUFACTURE OF REENFORCED FABRIC BANDS.

Application filed September 4, 1919 Serial No. 321,581. Renewed July 13, 1922. Serial No. 574,822.

*To all whom it may concern:*

Be it known that I, LAWRENCE A. SUBERS, a citizen of the United States, residing at Lakewood, in the county of Cuyahoga and State of Ohio, have invented new and useful Improvements in Automatically-Acting Coating Devices in the Manufacture of Reenforced Fabric Bands, of which the following is a specification.

The invention has reference to an improvement in an automatically acting coating device for use in the manufacture of a reenforced fabric band which is formed of a series of yarn elements interwound upon a mandrel to produce layers or laminations thereon, which are afterwards flattened into the form of a band.

The particular objects of this invention are to provide means for directly producing a flattened band upon a flattened mandrel, for coating the same with liquid rubber, or other adhesive material, and for enclosing the flattened band in strips of non-adhesive material such as Holland cloth so as to form a temporary protection therefor, and to retain the rubber upon the coated band until it has passed through the pulling devices and vacuum and heat chamber where the solvents are sufficiently evaporated from the coating material to leave it in the desired solidified form.

The device by which the fabric band is pulled along the mandrel delivers it off the end of the mandrel without any tension thereon although its passage is resisted by the friction of the yarn elements interwound and laminated thereon under tension and by their resistance in passing over the expanded portion of the mandrel. The delivery of the fabric band to the vacuum and heat chamber without tension allows it to be flattened and compressed therein without practically any loss of width or increased thickness.

The invention also includes the insertion within the flattened fabric band of a thin band or core of reinforcing material such as a tough and flexible metal.

The invention has reference to the specific form of mandrel employed and to means therein for temporarily expanding the fabric and separating the yarn elements while enclosed in a bath of liquid rubber or other adhesive material of a predetermined consistency and under a predetermined amount of pressure so as to secure a complete coating of the yarn elements, and also to so temporarily displace the yarn elements as to uncover the normal crossing points thereof and to allow them to become coated with liquid rubber.

The invention further comprises the combination and arrangement of parts and construction of details hereinafter described, shown in the accompanying drawings and specifically pointed out in the claims.

This application is substituted for my prior application No. 704,410 filed June 18th, 1912, for an automatic device for coating fibrous elements from which a reenforced laminated cohesive interwound band is constructed.

In the accompanying drawings:

Figure 1 is a vertical longitudinal section of the device, showing the reels and spools for winding the fabric, the hollow mandrel, the coating device, the pulling device, the vacuum chamber, and means for feeding the metallic reinforcing band into the hollow mandrel.

Figure 2 is a plan view of the mandrel.

Figure 3 is a transverse section thereof on line *a—a* of Figure 2.

Figure 3ª is a transverse section on line *f—f* of Figure 2.

Figure 4 is a longitudinal vertical section of the mandrel.

Figure 5 is a horizontal section of the mandrel on the central line showing the fabric expanding portion.

Figure 6 is a transverse section thereof enlarged from a section on line *b—b* of Figure 2.

Figure 7 is a face view of one of the gates which automatically close the opening in the vacuum chamber through which the fabric passes.

Figure 8 is a vertical section thereof.

Figure 9 is an enlarged plan view of the rubber chamber, the mandrel with the fabric thereon, the means for applying Holland cloth thereto, and the pulling device.

Figure 10 is a side elevation thereof.

Figure 11 is an enlarged plan view of the overlapping guides for the Holland cloth.

Figure 12 is a vertical section through the pulling device for the fabric on line c—c of Figure 10.

Figure 13 is a perspective view of one of the serrated fabric engaging shoes mounted upon endless chains which form the pulling means for the fabric.

Figure 14 illustrates one of the chain blocks which carry the serrated shoes.

Figure 15 is a transverse section of one of said serrated shoes.

Figure 16 is a transverse section on line d—d of Figure 9, showing the guides for the Holland cloth.

Figure 17 is a transverse section of the same on line e—e of Figure 9, showing the inwardly turned edges of the guides.

Figure 18 is a horizontal section through the hollow standard $B^8$ through which the liquid rubber and metallic reinforcing ribbon or band pass to the interior of the hollow mandrel.

Figure 19 is a longitudinal section of the rubber applying chamber.

Figure 20 is a transverse section of the rubber applying chamber on line g—g of Figure 19, showing the gate for closing one of the openings through which the band passes.

Figure 21 is a perspective view of one of the gates and the end wall of the rubber applying chamber.

Figure 22 is a face view of the plug and gate for closing the entrance to the hollow standard to which the mandrel is indirectly attached by means of an extension tube.

Figure 23 is a longitudinal section thereof.

In these drawings the arrangement of the several reels and mandrel is substantially the same as shown and described in my previous Patents Nos. 1,189,751; 1,233,636; 1,209,903 and 1,208,399.

This portion of the device is illustrated in Figure 1. Here B, B', $B^2$ and $B^3$ form a series of reel carriers of which the alternate reel carriers rotate in opposite directions about the mandrel J which is secured at one end in a rigid tube Y secured to and in continuation of the tube $B^8$ in the bracket upon the main frame $B^{15}$.

Spools C, C are spaced about the reel carriers and upon these spools are stored the yarn elements F, F of which the fabric band is constructed and are guided to the mandrel by means of guiding and tension rollers $C^2$, $C^3$, $C^3$ and $R^{20}$ and spaced guide frames $F^7$, $F^7$.

The mandrel J is provided with an extended flattened blade J' upon which the yarn elements F are interwound and laminated to construct a flattened tubular fabric and the fabric is immediately passed through a chamber $1^a$ filled with fluid rubber under a predetermined amount of pressure and a certain consistency of composition, determined by the thickness of the coating required.

To insure a complete coating of the individual yarns in the yarn elements and also to change temporarily the crossing points of the yarn elements in the fabric while passing through the rubber chamber, the mandrel is widened at the center of the rubbed chamber at $J^2$ and as the yarn elements F, F pass over the widened portion they are temporarily spaced apart from each other and at a greater angle to the axis of the mandrel, thereby changing their points of crossing. The individual yarns in the yarn elements are also temporarily slightly separated from each other so that the rubber will have access to and coat the entire exposed surface of each yarn.

The extended edges of the mandrel are also longitudinally slotted at $J^3$, $J^3$ to admit rubber to the interior surface of the fabric band.

The rubber chamber $1^a$ has each end made in halves $1^b$ and $1^c$ (see Figure 21) for ease in assembling and an opening $1^d$, through which the mandrel and fabric pass, is protected by gates $1^e$ and $1^f$, gate $1^e$ secured by screw $1^g$ and gate $1^f$ sliding under gibs $1^h$, $1^h$, and pressed by a spring $1^j$, secured to pins $1^k$, $1^k$, thus permitting only a predetermined amount of liquid rubber to pass through on the fabric band. Each end of the rubber chamber is constructed in the same manner.

A pipe $1^l$ furnishes fluid rubber under pressure to the chamber $1^a$ and a dial $1^m$ indicates the amount of pressure therein.

A thin band of metal or other desired material $2^a$ is fed through a central opening $J^4$ in the mandrel which is large enough to permit of a coating of rubber to envelop the said band and when the fabric is pulled off from the mandrel this band travels therewith and becomes a reinforcing core adhering thereto.

In Figures 1, 18, 22 and 23 means are shown for feeding the reinforcing band to the mandrel. Here $2^b$ is a spool upon which this band is wound. $2^c$ is a guide roller therefor arranged to lead the band into the rear extremity of the mandrel. $2^d$ is a pipe T secured to the pipe $2^e$ which in turn is threaded into the hollow standard $B^8$ which supports the tube Y to which the mandrel J is secured. Rubber is fed therein at the desired pressure through pipe $D^5$.

The metal band $2^a$ passes through an opening $2^f$ in a plug $2^g$ which forms a closure for the outer end of the pipe T. $2^i$, and adjustable gates $2^h$ and $2^j$ prevent the rubber from escaping. Gate $2^h$ is stationary and gate $2^j$ is free to slide under the head of the screw $2^k$, being pressed by a spring $2^l$.

The fabric flattened by passing over the flattened mandrel is pulled along the mandrel by means of endless chains formed by links R pivoted to blocks $R^{12}$ upon which are mounted shoes $R^4$ having serrated edges, or any other desired form of gripping surface, which engage and pull the fabric along the mandrel, delivering it off the end of the mandrel free and without tension.

These chains are mounted on sprocket wheels $R^2$ and $R^3$ upon diametrically opposite sides of the mandrel and the shoes are kept in engagement with the fabric by means of adjustable bearing plates $R^{13}$, $R^{13}$ mounted upon a bracket $R^{14}$ upon which also the rubber chamber is supported.

The chains are operated by power applied to shaft $V^{12}$, gear $V^9$ and intermeshing gears $R^8$, $R^8$ mounted on the sprocket wheels shafts $R^6$ and $R^7$.

The mandrel J extends the full length of the pulling chain, and that portion of the mandrel is recessed top and bottom at $J^5$ and $J^6$ so that there is a space between the encompassing fabric band and the recessed parts thereof. The serrated pulling shoes $R^4$ are thus enabled to engage the fabric band without their points $R^5$ engaging the mandrel and the band is thus pulled along with practically no displacement of the yarn elements, due to their tension on the mandrel. The fabric band as it leaves the end of the mandrel closes around the flat reinforcing ribbon $2^a$ and they pass together as a unit into the vacuum and heat chamber G and over a series of fluted pulling and drying rolls $H^2$, $H^2$ where the solvents in the liquid rubber or other adhesive material are evaporated to a predetermined degree, and the tension on the fabric band tends to flatten and close it tightly around the reinforcing element $2^a$. An opening $F^{18}$ in the walls of this vacuum chamber G admits the fabric band, the air being substantially excluded by adjustable gates consisting of a stationary male jaw $H^{15}$ and a sliding female jaw $H^{16}$ operated by a spring $H^{17}$ and mounted on a plate $H^{18}$ attached to the chamber G.

The toothed wheels $H^2$, $H^2$ serve also as a pulling means for the fabric band and its core and compress the fabric upon the core.

To prevent the loss of exterior coating or of any part thereof from pressure by the squeezing out of the rubber from the coated yarns and yarn elements, bands $3^a$ of a non-adhesive substance such as Holland cloth are caused to envelop the band and travel therewith as it passes through the chain pulling device.

These bands are stored upon spools $3^b$ and pass through sheet metal guides $3^c$, $3^d$ secured upon each side of the mandrel as shown in Figures 9, 10, 11, 16 and 17.

The guides are first turned over at $3^e$ at their edges to retain the Holland cloth. One of the guides next overlaps the other as shown in Figure 16 and finally the outer guide extends beyond the other at $3^f$ and is shaped to overlap the edges of the Holland cloth strips or bring them closely together as shown in Figure 11.

By the term "yarn elements" as used in these specifications and claims is meant a group of close lying parallel yarns or threads of a predetermined number and diameter forming a flat band.

It is obvious that the fabric band may be made without a reinforcing element embodied therein, without departing from the spirit of the invention or the scope of the claims.

It is also obvious that the pulling chain mechanism of any desired length may be used in the vacuum and heat chamber to take up and carry along the fabric with or without the reinforcing element until the solvents may be sufficiently evaporated therefrom to leave it in the desired solidified state, without departing from the spirit of the invention or the scope of the claims.

Having described the invention and the preferred embodiment thereof, I claim:

1. In combination with a mandrel free at one end, upon which a fabric is wound, a coating means and a pulling and compressing means and guide strips intermediate between said pulling and compressing means for applying bands of non-adhesive material to said coated band, said guide strips having their edges bent to confine said bands, one guide strip overlapping the other and extending beyond the same.

2. The combination with a mandrel on which a hollow fabric band is wound, said mandrel having longitudinal recesses on opposite sides, of oppositely placed pulling devices, including engaging members for the fabric, said members engaging said fabric where said fabric passes over said longitudinal recesses in said mandrel.

3. The combination with a mandrel for winding a flattened tubular fabric, said mandrel having a flat body portion and outer extremity, and provided with oppositely placed lateral extensions intermediate of its ends, said lateral extensions being provided with longitudinal slots and longitudinally tapering toward both extremities, of a coating chamber surrounding said lateral extensions.

LAWRENCE ALONZO SUBERS.